United States Patent Office 3,847,901
Patented Nov. 12, 1974

3,847,901
3-ALKENYL SUBSTITUTED RIFAMYCIN SV COMPOUNDS
Renato Cricchio, Varese, Italy, assignor to Gruppo Lepetit S.p.A., Milan, Italy
No Drawing. Filed Dec. 22, 1972, Ser. No. 317,732
Int. Cl. C07d 99/02, 99/04
U.S. Cl. 260—239.3 P        12 Claims

ABSTRACT OF THE DISCLOSURE

The present invention is concerned with substituted rifamycin SV compounds and more particularly relates to 3-alkenyl substituted rifamycin SV compounds of the formula

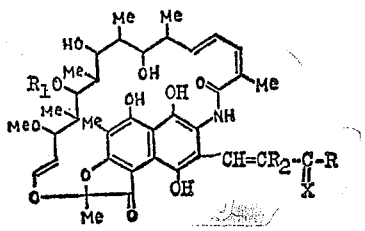

wherein R represents hydrogen, alkyl or aryl-lower alkyl, $R_1$ represents hydrogen or acetyl, $R_2$ represents hydrogen or lower alkyl, X represents oxygen, imino, substituted imino, oximino, substituted oximino, hydrazono or a substituted hydrazono radical.

SUMMARY OF THE INVENTION

The present invention is concerned with new rifamycin SV based compounds. More particularly the invention relates to 3-alkenyl substituted rigamycin SV compounds of the formula

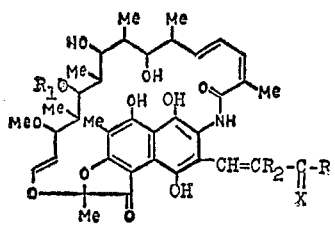

wherein R represents hydrogen, normal and branched chain alkyl of from one to about eight carbon atoms or aryl-lower alkyl, $R_1$ represents hydrogen or acetyl, $R_2$ represents hydrogen or lower alkyl, X represents oxygen, imino, substituted imino, oximino, substituted oximino, hydrazono or a substituted hydrazono radical. The term lower alkyl as used herein includes alkyl groups having from one to about four carbon atoms. The terms substituted imino, substituted oximino and substituted hydrazono as used herein refer to imino, oximino, and hydrazono groups having the hydrogen member substituted by (1) a saturated or unsaturated straight or branched chain aliphatic group, which group may contain substituents such as, for example, hydroxy, carboxy, phenyl and substituted phenyl or (2) an aromatic group such as, for example, phenyl, substituted phenyl or naphthyl. With the substituted hydrazono groups, the substituents on the nitrogen atom may also form a heterocyclic ring such as for instance piperazine, morpholine, piperidine, heptamethyleneimine, octamethyleneimine, 3,8-diazabicyclo[3,2,1]octane. It is also to be understood that the corresponding hexahydro rifamycin compounds are included in the present invention.

The imino or substituted imino compounds are Schiff's bases formed by reaction of compounds of the depicted formula wherein X is oxygen, with primary amines. The oximino compounds are the condensation products of compounds wherein X is oxygen with hydroxylamine or O-substituted hydroxylamine. The terms hydrazono and substituted hydrazono refer to the reaction products of compounds where X is oxygen with hydrazine or N-substituted hydrazines.

According to a general method to perform the invention, the key compound for the preparation of the above class of substances is a 3-formylrifamycin SV which is reacted with a suitable alkylidenephosphorane or aralkylidenephosphorane under the conditions which are known as the Wittig reaction. The following reaction scheme, wherein R, $R_1$ and $R_2$ have the same significance as before, illustrates the process for preparing the carbonyl compounds.

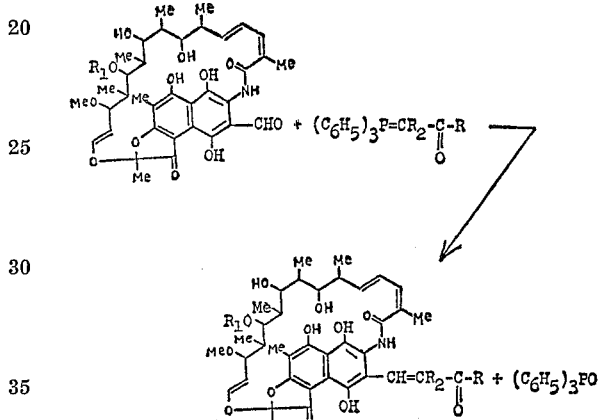

The reaction solvents for this process are selected from organic inert carrier liquids such as, for example, tetrahydrofuran, ethyl acetate, dioxane, benzene and chloroform. The ylide intermediates are prepared from halo, ketones and triphenyl phosphine according to the procedure described by Ramirez et al., J. Org. Chem., 22, 41 (1957) or by H. J. Bestman et al., Chem. Ber. 95, 1513 (1962).

Another suitable method for preparing the carbonyl compounds of the invention involves a condensation reaction of 3-formylrifamycin SV or its 25-desacetyl or 16,17,18,19,28,29-hexahydro derivative with an aldehyde or ketone of the formula $CH_2R_2$—CO—R according to the following scheme:

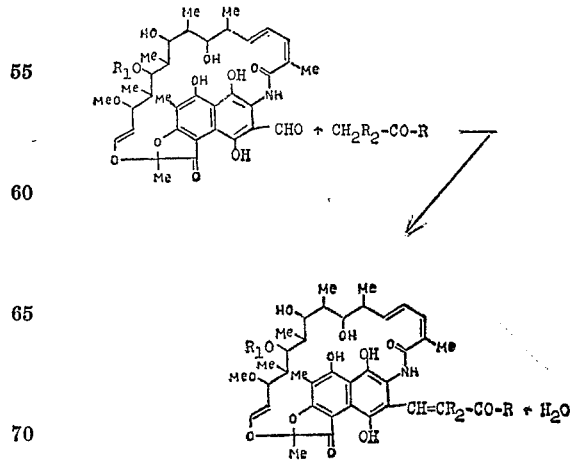

This reaction ordinarily is carried out in the presence of a basic catalyst such as for instance an alkali metal hydroxide amine, alkali alkoxide or alkali metal amide. A preferred mode to carry out the condensation follows essentially the same reaction conditions as the Knoevenagel condensation (Org. Reactions, vol. 15, 204, John Wiley, 1967). In this case the basic catalyst is generally selected from ammonia or amines such as, for example, piperidine, pyridine, or diethylamine. Other catalysts usually employed are ammonium or alkali metal salts with organic acids, such as, ammonium, potassium or sodium acetate. More particularly, the reaction is advantageously carried out in tetrahydrofuran as the solvent by reacting a 3-formylrifamycin SV derivative with a predetermined aldehyde or ketone at a temperature ranging from about 0 to about 5° C. A mixture of piperidine:acetic acid at a 5:1 molar ratio preferably is employed as the catalyst.

The resulting carbonyl compounds may be further reacted according to usual procedures with about one molecular proportion of a selected primary amine or hydroxylamine or hydrazine derivative to prepare the corresponding imino, oximino and hydrazono compounds of the present invention. This condensation reaction is generally carried out at room temperature and by using an inert carrier liquid such as, for example, tetrahydrofuran which is a preferred solvent. The end compounds are colored solids which decompose on melting, and which can be easily crystallized from ethyl acetate or other organic solvents such as methanol and ethanol. They are fairly soluble in acetone, tetrahydrofuran, dioxane and chloroform.

DESCRIPTION OF PREFERRED EMBODIMENTS

The following examples will serve to further illustrate the present invention but are not meant to limit it thereto.

Example 1.—3-(3-oxo-1-butenyl)-rifamycin SV

To a solution of 10 g. of acetonylidenetriphenylphosphorane in 600 ml. of tetrahydrofuran, 7.2 g. of 3-formylrifamycin SV is added and the mixture is refluxed for 3 hours. After concentration to a small volume, 300 ml. of ethyl acetate is added and the organic solution is washed with acidic water (pH=2) and then with water. The residue obtained after evaporation of the dried organic solution is crystallized twice from ethyl acetate. Yield 60%. The solid does not have a well defined melting point. It decomposes slowly between 200 and 290° C. The most significant visible and U.V. absorption bands are the following

| $\lambda_{max}$ (m$\mu$) | 485 | 340 | 262 |
|---|---|---|---|
| $E_1^{1\%}$ cm | 160.5 | 291.5 | 386.5 |

Analysis.—Calculated for $C_{41}H_{51}NO_{13}$: C, 64.30; H, 6.71; N, 1.83. Found: C, 63.62; H, 6.61; N, 1.30.

Example 2.—3-(3-phenylhydrazono-1-butenyl)-rifamycin SV

To a solution of 1.5 g. of the compound of the previous example in 50 ml. of tetrahydrofuran, 220 mg. of phenylhydrazine is added at room temperature under stirring. After two hours the precipitated solid is collected on filter and crystallized from ethyl acetate. Yield 60%. The solid decomposes on heating over 210° C.

| $\lambda_{max}$ (m$\mu$) | 475 | 360 |
|---|---|---|
| $E_1^{1\%}$ cm | 181.9 | 379.0 |

Analysis.—Calculated for $C_{47}H_{57}N_3O_{12}$: C, 65.95; H, 6.71; N, 4.91. Found: C, 65.40; H, 6.58; N, 4.35.

Example 3.—3-(3-phenethyloximino-1-butenyl)-rifamycin SV

The compound is prepared as described in the previous example by using O-phenethylhydroxylamine instead of phenylhydrazine. Yield 87%. M.p. 168–173° C. with decomposition.

| $\lambda_{max}$ (m$\mu$) | 478 | 337 | 262 |
|---|---|---|---|
| $E_1^{1\%}$ cm | 136.5 | 339.4 | 349.5 |

Analysis.—Calculated for $C_{49}H_{60}N_2O_{13}$: C, 66.50; H, 6.83; N, 3.16. Found: C, 65.23; H, 6.81; N, 3.28.

Example 4.—3-(3-benzyloximino-1-butenyl)-rifamycin SV

To a solution of 800 mg. of the compound of Example 1 in 40 ml. of tetrahydrofuran 160 mg. of O-benzylhydroxylamine hydrochloride and 2 ml. of pyridine are added. After 60 minutes the solution is concentrated to dryness and the residue dissolved in ethyl acetate. The organic solution is washed with water and then evaporated in vacuo. The residue crystallized from ethyl acetate melts at 183–190° C. with decomposition. Yield 60%.

| $\lambda_{max}$ (m$\mu$) | 470 | 336 | 258 | Shoulder at 230. |
|---|---|---|---|---|
| $E_1^{1\%}$ cm | 154.8 | 338 | 391 | |

Analysis.—Calculated for $C_{48}H_{58}N_2O_{13}$: C, 66.19; H, 6.71; N, 3.22. Found: C, 65.08; H, 6.61; N, 2.67.

Example 5.—3-[3-(4-methyl-1-piperazinyl)imino-1-butenyl]-rifamycin SV

The compound is prepared according to the same procedure of Example 2 by using 1-amino-4-methylpiperazine instead of phenylhydrazine. Yield 65%. M.p. 160° C. with decomposition.

| $\lambda_{max}$ (m$\mu$) | 480 | 338 | 261 | 271 |
|---|---|---|---|---|
| $E_1^{1\%}$ cm | 351.6 | 369.1 | 295.8 | 136.8 |

Analysis.—Calculated for $C_{46}H_{62}N_4O_{12}$: C, 64.02; H, 7.24; N, 6.49. Found: C, 64.12; H, 7.24; N, 5.78.

Example 6.—3-($\beta$-formyl-vinyl)-rifamycin SV

One gram of 3-formylrifamycin SV is suspended in 70 ml. of tetrahydrofurane and a mixture of 1 ml. of piperidine and 0.2 ml. of acetic acid is added on cooling on ice bath at 0–5° C. After addition of 0.2 ml. of acetaldehyde, the mixture is stirred for two hours and then concentrated to small volume under vacuum. The residue is diluted with ethyl acetate and the solution is washed with acidic water. The organic phase is evaporated and the residue chromatographed through 100 g. of silicagel buffered at pH 6 by eluting with chloroform:acetone 1:1. Yield 250 mg. of the titular product. M.p. >200° C. with decomposition.

| $\lambda_{max}$ (m$\mu$) | 500 | 385 |
|---|---|---|
| $E_1^{1\%}$ cm | 176 | 410 |

Analysis.—Calculated for $C_{40}H_{49}NO_{13}$: C, 63.90; H, 6.57; N, 1.86. Found: C, 63.46; H, 6.68; N, 1.77.

Example 7.—3-[3-(4-methyl-1-piperazinyl)imino-1-propenyl]-rifamycin SV

The compound is prepared from 3-($\beta$-formyl-vinyl)-rifamycin SV and 1-amino-4-methylpiperazine according to the procedure of Example 2. M.p. >200° C. dec.

| $\lambda_{max}$ (m$\mu$) | 485 | 384 | 260 |
|---|---|---|---|
| $E_1^{1\%}$ cm | 164 | 426 | 177 |

Analysis.—Calculated for $C_{40}H_{62}N_4O_{12}$: C, 63.66; H, 7.12; N, 6.60. Found: C, 64.60; H, 6.64; N, 5.91.

Additionally, other rifamycin derivatives of the invention or their 25-desacetyl and hexahydro derivatives wherein R, R₂ and X have the following meaning can be Representative examples are listed in the following Table I.

TABLE I

| Example No. | R | R₂ | X |
|---|---|---|---|
| 8 | H | H | =N—C₆H₅ |
| 9 | H | H | =N—NH—C₆H₃(NO₂)₂ (2,4-dinitrophenyl) |
| 10 | H | H | =N—N(piperazine)NH |
| 11 | H | H | =N—N(2,6-dimethylpiperidine)—C₆H₅ |
| 12 | H | H | =N—NH—(CH₂)₂—C₆H₅ |
| 13 | H | H | =N—N(C₃H₇)₂ |
| 14 | H | H | =N—NH—(adamantyl-H) |
| 15 | H | H | =NO—(CH₂)₇—CH₃ |
| 16 | CH₃ | H | =N—NHCH₃ |
| 17 | CH₃ | H | =N—NH—CH₂—CH₂OH |
| 18 | CH₃ | H | =N—NH—C₆H₄—CH₃ |
| 19 | CH₃ | H | =N—NH—CH₂—C₆H₅ |
| 20 | CH₃ | H | =N—N(CH₃)₂ |
| 21 | CH₃ | H | =N—NH—C₆H₄—CF₃ |
| 22 | CH₃ | H | =N—NH—C₆H₄—SO₂CHF₂ |
| 23 | CH₃ | H | =N—NH—C₆H₃(SO₂CH₃)(SO₂—CH₃) |
| 24 | CH₃ | H | =NO—(cyclopentyl-H) |
| 25 | CH₃ | H | =N—O—CH(C₃H₇)₂ |
| 26 | CH₃ | H | =N—O—CH(C₆H₅)₂ |
| 27 | —C₂H₅ | H | =O |
| 28 | —C₂H₅ | H | =N—(cyclohexyl-H) |
| 29 | —C₂H₅ | H | =N—NH₂ |
| 30 | —C₂H₅ | H | =N—NH—C₆H₃(NO₂)(NO₂) |
| 31 | —C₂H₅ | H | =N—N(C₂H₅)₂ |
| 32 | —C₂H₅ | H | =N—N(C₆H₅)₂ |
| 33 | —C₂H₅ | H | =N—NH—(cycloheptyl-H) |
| 34 | —C₂H₅ | H | =N—NH—CH₂—CH=CH₂ |
| 35 | —C₂H₅ | H | =N—NH—CH₂—CH=CH—C₆H₅ |
| 36 | —C₂H₅ | H | =N—NH—CH₂—CH₂—N(C₂H₅)₂ |
| 37 | —C₂H₅ | H | =N—N(piperazine)NH |

TABLE 1—Continued

| Example No. | R | R₂ | X |
|---|---|---|---|
| 38 | —C₂H₅ | H | =N—NH(CH₃)(CH₃ piperazine ring)N—CH₂C₆H₅ |
| 39 | —C₂H₅ | H | =NO—geranyl |
| 40 | —C₂H₅ | H | =N—O(CH₂)₃—CH₃ |
| 41 | —(CH₂)₄—CH₃ | H | =O |
| 42 | —(CH₂)₄—CH₃ | H | =N—NH—C₂H₅ |
| 43 | —(CH₂)₄—CH₃ | H | =N—N(CH₂—CH₂OH)₂ |
| 44 | —(CH₂)₄—CH₃ | H | =N—NH—C₆H₃(NO₂)₂ (2,4-dinitrophenyl) |
| 45 | —(CH₂)₄—CH₃ | H | =N—NH—C₆H₄—CF₃ |
| 46 | —(CH₂)₄—CH₃ | H | =N—OH |
| 47 | —(CH₂)₄—CH₃ | H | =N—O—C₂H₅ |
| 48 | —(CH₂)₄—CH₃ | H | =N—O—CH₂—CH₂—O—C₆H₅ |
| 49 | —(CH₂)₆—CH₃ | H | =N—N(piperazine)NH |
| 50 | —(CH₂)₆—CH₃ | H | =O |
| 51 | —(CH₂)₆—CH₃ | H | =N—(CH₂)₃—N(CH₃)(CH₃) |
| 52 | —(CH₂)₆—CH₃ | H | =N—HC(CH₃)(C₆H₅) |
| 53 | —(CH₂)₆—CH₃ | H | =N—N(CH₃)(C₆H₅) |
| 54 | —(CH₂)₆—CH₃ | H | =N—NH—C₆H₄—COOH |
| 55 | —(CH₂)₆—CH₃ | H | =N—O—CH₂—CH₂—(4-pyridyl) |
| 56 | —C₂H₅ | H | =N—N(piperazine with 2,6-diCH₃, N-C₆H₅) |
| 57 | —C₃H₇ | H | =O |
| 58 | —C₃H₇ | H | =N—(2-naphthyl) |
| 59 | —C₃H₇ | H | =N—CH₂—CH₂—O—C₆H₄—CO—NH₂ |
| 60 | —C₃H₇ | H | =N—N(CH₃)(CH₂—C₆H₅) |
| 61 | —C₃H₇ | H | =N—O—CH₂—C₆H₅ |
| 62 | —C₃H₇ | H | =N—O—CH₂—CH=CH₂ |
| 63 | —C₃H₇ | H | =N—O—CH₂—CH₂—CH₂—C₆H₅ |
| 64 | —CH₂—C(CH₃)₂—CH₃ | H | =O |
| 65 | —CH₂—C(CH₃)₂—CH₃ | H | =N—N(piperazine)NH |

TABLE 1—Continued

| Example No. | R | R$_2$ | X |
|---|---|---|---|
| 66 | $-CH_2-C(CH_3)_2-CH_3$ | H | =N−N(piperazine)N−CH$_3$ |
| 67 | $-CH_2-C(CH_3)_2-CH_3$ | H | =N−O−C$_3$H$_7$ |
| 68 | $-CH_2-C(CH_3)_2-CH_3$ | H | =N−O−(CH$_2$)$_2$−C$_6$H$_5$ |
| 69 | −(CH$_2$)$_2$−C$_6$H$_5$ | H | =O |
| 70 | −(CH$_2$)$_2$−C$_6$H$_5$ | H | =N−NH$_2$ |
| 71 | −(CH$_2$)$_2$−C$_6$H$_5$ | H | =N−N(CH$_3$)$_2$ |
| 72 | −(CH$_2$)$_2$C$_6$H$_5$ | H | =N−NH−(2-pyrimidinyl) |
| 73 | −(CH$_2$)$_2$−C$_6$H$_5$ | H | =N−N(C$_2$H$_5$)$_2$ |
| 74 | −(CH$_2$)$_2$−C$_6$H$_5$ | H | =N−O−C$_2$H$_5$ |
| 75 | −(CH$_2$)$_2$−C$_6$H$_5$ | H | =N−O−C$_6$H$_{11}$ |
| 76 | −(CH$_2$)$_2$−C$_6$H$_5$ | H | =N−OH |
| 77 | −(CH$_2$)$_2$−C$_6$H$_5$ | H | =N−O−CH$_2$−CH$_2$−COOH |
| 78 | −CH$_3$ | −C$_3$H$_7$ | =O |
| 79 | −CH$_3$ | −C$_3$H$_7$ | =N−N(CH$_2$−CH$_2$OH)$_2$ |
| 80 | −CH$_3$ | −C$_3$H$_7$ | =N−N(piperazine)NH |
| 81 | −CH$_3$ | −C$_3$H$_7$ | =N−NH−C$_6$H$_4$−SO$_2$CF$_3$ |
| 82 | −CH$_3$ | −C$_3$H$_7$ | =N−NH−C$_6$H$_3$(NO)(NO$_2$) |
| 83 | −CH$_3$ | −C$_3$H$_7$ | =N−N(pyrrolidine) |
| 84 | −CH$_3$ | −C$_3$H$_7$ | =N−O−CH$_2$−C≡CH |
| 85 | −CH$_3$ | −C$_3$H$_7$ | =N−O−CH(CH(CH$_3$)$_2$)−COOH |
| 86 | −C$_3$H$_7$ | −CH$_3$ | =O |
| 87 | −C$_3$H$_7$ | −CH$_3$ | =N−N(C$_3$H$_7$)(C$_6$H$_5$) |
| 88 | −C$_3$H$_7$ | −CH$_3$ | =N−N(piperazine)N−CH$_2$−C$_6$H$_5$ |
| 89 | −C$_3$H$_7$ | −CH$_3$ | =N−O−CH$_2$−CH$_2$−C$_6$H$_5$ |
| 90 | −(CH$_2$)$_2$−C$_6$H$_5$ | −C$_3$H$_7$ | =O |
| 91 | −(CH$_2$)$_2$−C$_6$H$_5$ | −C$_3$H$_7$ | =N−NH−CH$_2$−CH$_2$−N(C$_2$H$_5$)$_2$ |
| 92 | −(CH$_2$)$_2$−C$_6$H$_5$ | −C$_3$H$_7$ | =N−N(piperazine)NH |
| 93 | −(CH$_2$)$_4$−CH$_3$ | −CH$_3$ | =O |
| 94 | −(CH$_2$)$_4$−CH$_3$ | −CH$_3$ | =N−NHCH$_2$−CH$_2$−C$_6$H$_5$ |

TABLE 1—Continued

| Example No. | R | R₁ | X |
|---|---|---|---|
| 95 | —(CH₂)₄—CH₃ | —CH₃ | =N—N(CH₃)—[piperazine ring with CH₃]—NH |
| 96 | —(CH₂)₄—CH₃ | —CH₃ | =N—O—CH₂—CH₂—COOH |
| 97 | —(CH₂)₄—CH₃ | —CH₃ | =N—NH—C₆H₃(SO₂F)—SO₂F |
| 98 | —(CH₂)₄—CH₃ | —CH₃ | =N—NH—C₆H₃(CH₃)—C(CH₃)₂CH₃ (with CH₃) |
| 99 | —(CH₂)₄—CH₃ | —CH₃ | =N—N(CH₃)—[ring]—NH—CH(CH₃)₂ |
| 100 | —(CH₂)₄—CH₃ | —CH₃ | =N—N(CH₃)—[ring with CH₃]—N—CH₂—C₆H₄—CF₃ |
| 101 | —(CH₂)₄—CH₃ | —CH₃ | =N—NH—[pyrrole/imidazole H] |

The invention compounds possess a high antibacterial activity which is particularly remarkable against *Streptococcus hemolyticus* and *Diplococcus pneumoniae*. In representative tests the minimum inhibiting concentration against these microorganisms was found to be ranging from 0.002 to 0.05 μg./ml. as shown from the following Table II.

TABLE II

[Minimal inhibitory concentrations (μg./ml.) in vitro]

| Compound of Example No. | 1 | 2 | 3 | 4 | 5 | 6 |
|---|---|---|---|---|---|---|
| Staphylococcus aureus | 0.1 | 0.1 | 0.02 | 0.01 | 0.2 | 0.01 |
| Staphylococcus aureus (with 20% of bovine serum) | 0.2 | 0.05 | 0.2 | 0.05 | 0.02 | 0.02 |
| S. aureus Tour | 0.1 | 0.1 | 0.05 | 0.02 | 0.1 | 0.02 |
| Streptococcus hemolyticus | 0.005 | 0.2 | 0.05 | 0.002 | 0.002 | 0.01 |
| Streptococcus faecalis | 0.5 | 1 | 0.1 | 0.1 | 0.5 | 0.01 |
| Diplococcus pneumoniae | 0.005 | 0.05 | 0.002 | 0.002 | 0.002 | 0.02 |
| Proteus | 100 | 50 | 50 | 50 | 100 | 100 |
| E. coli | 100 | 10 | 50 | 50 | 100 | 100 |
| Klebsiella pneumoniae | 100 | 100 | 100 | 50 | 100 | 100 |
| Pseud. aereata | 100 | 100 | 100 | 100 | 100 | 100 |
| Myc. Tub. H₃₇Rv | 0.5 | 0.5 | 0.5 | 0.1 | 1 | 1 |

The antimicrobial activity is coupled with a low toxicity. Another very important feature of the invention compounds is their inhibiting activity of DNA polymerases which are characteristic of human leukemic blood lymphoblasts and against typical nucleotidyl transferases (polymerases) of virus not utilized by the normal cell. It is known from studies on representative members of virus groups that they either carry or induce into the host cells polymerases as an essential part of their replication. Thus, there are viruses such as picornaviruses or polioviruses which induce RNA-dependent-RNA-polymerase while other groups such as leukemia-sarcoma viruses carry an RNA-dependent DNA polymerase. The presence and the very important role of the RNA-dependent DNA-polymerase reverse transcriptase in oncogenic RNA-viruses has been discovered by B. Baltimore, Nature, 226, 1209 (1970) and by H. M. Temin et al., Nature, 226, 1211 (1970). Recent discovery of RNA-dependent DNA polymerase enzyme in RNA tumor viruses of animal species has been confirmed also by other authors as it results for instance from the papers hereinbelow listed:

Green et al., "Mechanism of Carcinogeneses by RNA Tumor Viruses, I. An RNA-Dependent DNA Polymerase in Murine Sarcoma Viruses" (Proc. Nat. Acad. Sci. U.S.A., 67, 385–393, 1970).

Spiegelman et al., "Characterization of the Products of RNA Directed DNA-Polymerases in Oncogenic RNA Viruses" (Nature, London, 227, 563, 1970).

Hatanaka et al., "DNA Polymerase Activity Associated With RNA Tumor Viruses" (Proc. Nat. Acad. Sci., U.S.A. 67, 143, 1970).

Scolnick et al., "DNA Synthesis by RNA Containing Tumor Viruses" (Proc. Nat. Acad. Sci., U.S.A. 67 1034, 1970).

RNA virus implication in some tumors has been supported also by other facts: reverse transcriptase has been found to be present in particles from human milk contained from women with a familiar history of breast cancer and from imbred populations (Scholin et al., Nature, 231, 97, 1971). Priori et al. (Nature New Biology, 232, 16, 1971) meanwhile, isolated virus named ESP-1 containing reverse transcriptase from cells from the pleural fluid of a child with lymphoma and have successfully grown it in tissue cultures.

The presence in human breast cancer of RNA homologous to mouse mammary tumor virus RNA has been demonstrated through molecular hybridation experiments by R. Axel et al. (Nature, 235, 32, 1972). The possibility of human breast cancer virus was also supported by electron microscopy of human milk (N. H. Sarkar et al., Nature, 236, 103, 1972).

RNA-directed DNA-polymerase activity and virus like particles have been isolated also from human rhadomyosarcoma cells (McAllister et al., Nature, New Biol., 235, 3, 1972).

At present there are no very effective drugs for treating viral diseases since viruses and cells have common metabolic requirements and pathways. The most promising approach to viral chemotherapy clearly is the design of suitable chemicals which combine specifically with viral or virus transformed cell polymerases but not with host cell polymerases controlling the expression of genetic information of viruses. Specific inhibitors of the viral or virus transformed cell enzymes and, in particular, inhibitors of polymerases of RNA tumor viruses may have an important role in providing drugs for leukemia and other cancer therapy.

The inhibiting activity of the invention compounds has been tested on RNA dependent DNA polymerase of murine sarcoma virus (endogenous) and DNA dependent DNA polymerase activity of purified enzymes (poly d A-T as template). The inhibition was tested according to the methods described by C. Gurgo et al., Nature, New Biology, 229, 111, 1971. The effect of different concentrations of drugs on polymerase activity was determined by following $^3$H-dTTP (tritiated thymine deoxyriboside triphosphate) incorporation into the insoluble fraction. A typical example of the experimental procedures is the following:

Isolation of virus and purification of viral polymerase

Virus was isolated and purified from murine sarcoma virus (Moloney isolate) transformed rat cells and murine sarcoma virus (Harvey isolate) transformed mouse cells as previously described (Green et al., Proc. Nat. Acad. Sci. U.S., 67, 385–393, 1970; Rokutanda et al., Nature, 227, 1026–1028, 1970). The virion polymerase was purified 20–40 fold by incubation of purified virus with 0.5% NP-40 (nonidet P-40) in 0.1 M NaCl, 0.01 M tris buffer (pH 7.6), 0.001 M EDTA for 5 minutes at room temperature and zonal centrifugation in 15–30% sucrose gradients in 10 mM. sodium phosphate buffer (pH 7.4), 2.5 mM. $MgCl_2$, 10 mM. dithiothreitol, and 5% glycerol for 24 hours at 38,000 r.p.m. in a Spinco SW4 1 rotor. The peak fractions of enzyme activity (13–17) of twenty-two fractions collected, were pooled, and stored at minus 70° C. in 30% glycerol.

DNA polymerase assay

Enzyme incubation was performed for one hour at 37° C. in 100 μl. of reaction mixture containing 40 mM. tris buffer (pH 8.0), 5 mM. dithiothreitol, 30 mM. NaCl, 2.5 mM. $MgCl_2$, 0.1 mM. dATP, dGTP, dCTP, and 10 μCi. of $^3$H-dTTP (12–18 ci./mmole) as described by Green et al. in Proc. Nat. Acad. Sci. U.S., 67, 385–393, 1970. The reaction was terminated by the addition of 150 μl. of 1N perchloric acid. Calf thymus DNA (100 μg.) was added as carrier; the radioactive DNA product was processed as described in the two papers mentioned above. Endogenous RNA-dependent DNA polymerase activity was measured after the addition of 0.01% NP-40 to purified virus at the time of assay. The DNA polymerase activity of purified viral polymerase was measured with 2 μg. of poly d (A-T) as template and no NP-40.

Test for inhibition by rifamycin compounds

Representative rifamycin compounds of the present invention were dissolved in dimethylsulfoxide (DMSO) at a concentration of 5 mg./ml. and stored at 4° C. Inhibition of the endogenous RNA-dependent DNA polymerase activity was tested by adding 2 μl. of derivative appropriately diluted in DMSO or 2 μl. of DMSO (control) to the assay mixture prior to the addition to disrupted virus which contained 15 to 30 μg. of viral protein. Enzyme incubation was performed for 60 minutes at 37° C. Inhibition of purified enzyme was tested by pre-incubation of 2 μl. of derivative or DMSO with 30 μl. of enzyme (1 to 2 μg. of protein) for 10 minutes at 37° C.; then 70 μl. of substrate mixture were added and the mixture further incubated and processed as described above. In representative tests the invention compounds at a concentration of 2–100 μg./ml. or less reduced the incorporation of $H^3$-dTTP to less than 10 percent than found in the control tests, clearly demonstrating inhibition of mechanism of carcinogenesis by RNA tumor viruses according to the most recent biochemical points of view. The inhibiting effect of reverse transcriptases has been confirmed also by tests on polymerase from murine leukemia virus. Murine leukemia virus RNA-dependent DNA-polymerase was prepared from Triton X100 disrupted virions as described by Gallo et al. in Nature, New Biology, 232, 141 (1971). Virus of both Rauscher and Moloney types were previously purified by banding in the 1.16 g./ml. region of a sucrose density gradient after initial low speed centrifugation to remove cellular debris and cushioning on 60% sucrose through 20% sucrose. Final concentration of virus preparation was at $10^{11}$ particles/ml. As template endogenous 70 SR.N.A. was used. Concentrations of 50 μg./ml. or less were found to be effective in inhibiting the enzyme. Similar results were found by using tumor cell polymerases of human origin. In this case the inhibiting activity was studied also on normal cell polymerases to characterize a selective effect. Representative rifamycin derivatives of the present invention have been evaluated for their effects on two purified DNA polymerases isolated from (1) human normal (PHA stimulated) blood lymphocytes, (2) a lymphoblast cell line (derived from a normal donor) and (3) human leukemic blood lymphoblast. Synthetic and/or native templates were used. A typical example of the experimental procedure is the following:

Human blood lymphoblasts

Leukemic lymphoblasts were isolated from the peripheral blood of patients with acute lymphocytic leukemia (ALL) by leukophoresis. The cells were washed and erythrocytes removed by hypotonic lysis.

Normal lymphocytes were obtained from the peripheral blood from healthy donors after removal of granulocytes by nylon column chromatography. They were stimulated with phytohemagglutinin (PHA) for 72 hours as described before (Gallo et al., Nature, 228, 927, 1970; Gallo et al., Science, 165, 400, 1968) in order to maximize DNA polymerase activity. However, because of the logistic problems in obtaining sufficient amounts of these cells, a human "normal" tissue culture cell line (1788) was used to supply less purified DNA polymerases for some of the initial survey studies. Compounds of interest were then studied in more detail with the more purified enzymes from the normal and leukemic blood lymphocytes. These tissue culture cells were obtained from Associated Biomedic Systems, Inc.

DNA polymerase preparations

Cellular DNA polymerases were extracted and purified from normal blood (PHA stimulated) lymphocytes, and leukemic blood lymphocytes and 1788 lymphoid cells by homogenization in hypotonic buffer followed by Triton X100 and/or high salt extraction of the extralysosomal pellet. After differential centrifugation cellular extracts were further purified by DEAE cellulose, phosphocellulose, and Sephadex G200 column chromatography.

DNA polymerase assays

DNA polymerase assays were carried out in a final volume of 100 μl. The assay mixture contained tris-HCl buffer, pH 8.3, 50 mM.; MgAc, 6.0 mM.; dithiothreitol, 8.0 mM.; NaCl, 60 mM. Adjustment of pH was carried out after addition of inhibitors which were previously dissolved in dimethyl sulfoxide (DMSO). The final concentration of DMSO was 0.5% and all control samples included this amount of DMSO. An enzyme concentration that catalyzes an incorporation of approximately 1.0 pmole/hr. was used in the assay. The enzyme was in most cases preincubated for 5 minutes with the inhibitor. The reaction was then initiated by the addition of template either synthetic DNA (poly d(AT) Miles Lab.) and DNA.RNA hybrid (oligo dT. poly rA), at 5 μg./ml. or native templates: activated salmon sperm DNA at 50

μg./ml., and endogenous 70S viral RNA; 10 μCi. of ($^3$H-methyl)-TTP (New England Nuclear, 18.6 mCi./μmole, lyophilized and redissolved in 0.01 M HCl just prior to usage) and dATP ($8 \times 10^{-5}$ M, with synthetic template) or all three deoxynucleoside triphosphates ($8 \times 10^{-5}$ M with RNA or DNA templated reactions). In some experiments there was no preincubation of enzyme with inhibitor. In these cases reactions were initiated by adding enzyme to the complete reaction mixture which included the inhibitor. Samples were withdrawn at the start of incubation and after 30 minutes and terminated by the addition of 2 ml. of 0.80 M sodium pyrophosphate, and precipitated in 12.5% cold trichloroacetic acid (TCA) with yeast RNA (400 μg.) as carrier. The products were collected on Millipore filter, washed extensively with 5% TCA and 1 ml. of DMSO-ethanol-0.1 M NaCl mixture (0.5:70:29:5), dried and counted in 2 ml. of BBS$_3$ (Beckman) and 10 ml. of liquifluor (New England Nuclear) in a Packard liquid scintillation counter. Concentrations varying from 5 to 20 μg./ml. were found to provoke a 50% inhibition of leukemic polymerase with a synthetic DNA template. Reaction templated by a synthetic RNA template (poly rA.rU) were even more susceptible. Representative experiments carried out with native template on normal and tumor cells polymerase showed a higher susceptibility of the tumor enzymes to the tested compounds.

Other biological characteristics displayed by the new rifamycin compounds include inhibition of focus formation on mouse, rat and human cells by the Moloney and Kirsten strain of murine sarcoma virus; selective inhibition of virus production by already transformed mouse and human cells; detection of revertant cells using the murine sarcoma virus transformed non-producer mouse and rat cell systems. The hydrazone compounds of the present invention have moreover confirmed their selective toxicity for virus transformed cells of mouse, rat and human origin when tested for colony forming ability.

In studies to determine the effect of the compounds in inhibiting focus formation by Moloney sarcoma virus on BALB/3T3 tissue cultures the following procedure is employed: BALB/3T3 cell cultures are grown in 250 ml. plastic flasks in growth medium consisting of Eagle's minimal essential medium with 10% fetal bovine serum. Cell counts are made with a Coulter counter after suspending the cells with trypsin-versene and diluting in growth medium. Moloney murine sarcoma virus, as a tumor homogenate is employed. It is passaged four times in a Swiss-derived high passage mouse embryo cell line and assayed for focus-forming units in BALB/3T3 cells. In conducting the studies, a modification of the method described by Hartley and Rowe, Proc. Nat. Acad. Sci., 55, 780 (1966) is used. In the present work, flasks are seeded with from $1-2 \times 10^6$ cells in 25 ml. of growth medium and incubated at 37° C. for 24 hours. Following the removal of fluids, virus at a predetermined number of focus forming units is introduced into 0.5 ml. of growth medium and allowed to adsorb on the monolayer of cells for 90 minutes at 37° C. Following this adsorption period, a predetermined quantity, usually as a dose rate of from about 5 to 10 μg./ml. of a rifamycin alkenyl compound (previously dissolved in dimethylsulfoxide at a concentration of 1 mg./ml.) and carried in 25 ml. of growth medium, is added and the cultures returned to the incubator. As a control, dimethylsulfoxide alone in the growth medium is added to a separate culture. After three days incubation the cultures are fluid-changed and foci of transformed cells counted at day seven.

In this same method, vesicular stomatitis virus, New Jersey serotype, is studied. Methods used to grow and assay this virus have been described by Hackett et al., Virology, 31, 114 (1967).

These properties indicate that these compounds possess an effective inhibitory activity on virus induced tumors in animals.

I claim:
1. A 3-alkenyl rifamycin SV compound of the formula

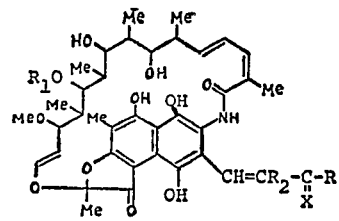

wherein R represents hydrogen, alkyl of from 1 to 8 carbon atoms or phenyl-lower alkyl, R$_1$ represents hydrogen or acetyl, R$_2$ represents hydrogen or lower alkyl, X represents oxygen, imino, substituted imino, oximino, substituted oximino, hydrazono or substituted hydrazono, said lower alkyl groups containing from 1 to 4 carbon atoms and said substituted imino, (a), oximino, (b), and hydrazono groups, (c), having the hydrogen member substituted respectively, by (a) dimethylaminopropyl or alpha - methyl - benzyl, (b) ethyl, propyl, butyl, octyl, propenyl, propynyl, dipropylmethyl, diphenylmethyl, benzyl, phenethyl, phenylpropyl, phenoxyethyl, carboxyethyl, pyridylethyl, phenoxyethyl or geranyl, or (c) methyl, ethyl, dimethyl, diethyl, dipropyl, phenylpropyl, hydroxyethyl, di - (2 - hydroxyethyl), (diethylamino)-ethyl, benzyl, phenylpropyl, propenyl, cinnamyl, (N-methyl, - N - phenyl), (N - methyl, N - benzyl) or phenyl group and further characterized in that in the substituted hydrazono group, the substituents on the nitrogen atom also may form a heterocyclic ring of the group consisting of piperazine, 4 - methyl - 1 - piperazine, morpholine, piperidine, heptamethyleneimine, octamethyleneimine or 3,8 - diazabicyclo(3,2,1)octane; and the 16,17; 18,19; and 28,29-hexahydro derivatives of said alkenyl compounds.

2. A 3-alkenyl rifamycin compound of Claim 1 wherein X is oxygen.
3. A 3-alkenyl rifamycin compound of Claim 1 wherein X is imino or substituuted imino.
4. A 3-alkenyl rifamycin compound of Claim 1 wherein X is oximino or substituted oximino.
5. A 3-alkenyl rifamycin of Claim 1 wherein X is hydrazono or substituted hydrazono.
6. The compound of Claim 1 which is 3 - (3 - oxo - 1-butenyl) - rifamycin SV.
7. The compound of Claim 1 which is 3 - (3 - phenylhydrazono - 1 - butenyl) - rifamycin SV.
8. The compound of Claim 1 which is 3 - (3 - phenethyloximino - 1 - butenyl) - rifamycin SV.
9. The compound of Claim 1 which is 3 - (3 - benzyloximino - 1 - butenyl) - rifamycin SV.
10. The compound of Claim 1 which is 3 - [3 - (4-methyl - 1 - piperazinyl)imino - 1 - butenyl] - rifamycin SV.
11. The compound of Claim 1 which is 3 - (β - formylvinyl) - rifamycin SV.
12. The compound of Claim 1 which is 3 - [3 - (4-methyl - 1 - piperazinyl)imino - 1 - propenyl] - rifamycin SV.

HENRY R. JILES, Primary Examiner

R. T. BOND, Assistant Examiner

U.S. Cl. X.R.

424—244, 248, 250, 251, 263, 267, 274

PO-1050
(5/69)

UNITED STATES PATENT OFFICE
CERTIFICATE OF CORRECTION

Patent No. 3,847,901      Dated November 12, 1974

Inventor(s) Renato Cricchio

It is certified that error appears in the above-identified patent and that said Letters Patent are hereby corrected as shown below:

Column 1, line 37, correct spelling of "rifamycin";

Column 5, line 1, after "can be" insert the following phrase: -- prepared according to the methods described above. --;

Column 13, line 35, change "SW4 1" to -- SW41 --;

Column 13, line 50, after "mentioned" insert the following -- above. Endogenous RNA-dependent DNA polymerase --;

Column 13, line 52, cancel the whole line beginning with "above" and ending with "polymerase";

Column 15, line 12, change "0.80 M" to -- 0.08 M --;

Column 16, line 45, correct spelling of "substituted".

Signed and sealed this 24th day of June 1975.

(SEAL)
Attest:

RUTH C. MASON
Attesting Officer

C. MARSHALL DANN
Commissioner of Patents
and Trademarks